(12) United States Patent
Ono et al.

(10) Patent No.: US 8,676,527 B2
(45) Date of Patent: Mar. 18, 2014

(54) INDUSTRIAL MACHINE

(75) Inventors: Noritsugu Ono, Utsunomiya (JP);
Kazuaki Kawarai, Utsunomiya (JP);
Seiichi Otsubo, Utsunomiya (JP);
Hirotada Anzai, Utsunomiya (JP);
Kazumi Mizukami, Utsunomiya (JP)

(73) Assignee: Mitutoyo Corporation, Kanagawa (JP)

( * ) Notice: Subject to any disclaimer, the term of this patent is extended or adjusted under 35 U.S.C. 154(b) by 356 days.

(21) Appl. No.: 13/191,104

(22) Filed: Jul. 26, 2011

(65) Prior Publication Data
US 2012/0029857 A1 Feb. 2, 2012

(30) Foreign Application Priority Data

Aug. 2, 2010 (JP) ................................. 2010-173599
Jul. 22, 2011 (JP) ................................. 2011-160700

(51) Int. Cl.
*G01C 17/38* (2006.01)

(52) U.S. Cl.
USPC .................... 702/95; 374/55; 33/503; 33/702

(58) Field of Classification Search
USPC ...................... 702/95; 33/503, 702
See application file for complete search history.

(56) References Cited

U.S. PATENT DOCUMENTS

| 5,523,953 A * | 6/1996 | Araie et al. .................... 700/193 |
| 5,794,356 A * | 8/1998 | Raab ................................ 33/503 |
| 2002/0020073 A1* | 2/2002 | Kikuchi ........................... 33/503 |
| 2004/0066831 A1* | 4/2004 | Shivaswamy et al. .......... 374/55 |
| 2010/0299094 A1* | 11/2010 | Hsu .................................. 702/95 |

FOREIGN PATENT DOCUMENTS

| JP | B2-2853500 | 2/1999 |
| JP | B2-2853501 | 2/1999 |
| JP | A-2001-021303 | 1/2001 |
| JP | B2-3822384 | 9/2006 |

* cited by examiner

*Primary Examiner* — John E Breene
*Assistant Examiner* — Stephanie Bloss
(74) *Attorney, Agent, or Firm* — Oliff PLC

(57) ABSTRACT

A coordinate measuring machine (industrial machine) includes: a column and a support that extend along the Z-axis; a beam being provided between the column and the support; a slider being movable on the beam; a ram being held on the slider movably along the Z-axis direction; a temperature detecting sensor and a temperature detector that detect the respective temperatures of the column, the support and the ram; and a shift amount calculator that calculates a Z-axis shift amount based on the respective temperatures of the column, the support and the ram, reference position data indicating a positional relationship between the column, the support and the ram at a reference temperature, and respective thermal expansion coefficients for the column, the support and the ram.

3 Claims, 5 Drawing Sheets

INDUSTRIAL MACHINE

The entire disclosure of Japanese Patent Application No. 2010-173599 filed Aug. 2, 2010 and Japanese Patent Application No. 2011-160700 filed Jul. 22, 2011 is expressly incorporated by reference herein.

BACKGROUND OF THE INVENTION

1. Field of the Invention

The present invention relates to an industrial machine with a mechanism capable of moving a ram in the Z-axis direction perpendicular to a base surface.

2. Description of Related Art

A typically known industrial machine is capable of a Z-axial movement of a ram held in a direction perpendicular to a base surface (see, for instance, Patent Literature 1: JP-A-2001-21303).

The industrial machine disclosed in Patent Literature 1 is a coordinate measuring machine. The coordinate measuring machine includes: column and support that are set perpendicular to the base surface and are movable in the Y-axis direction; a beam provided between ends of the column and support; a slider that are movable on the beam in the X-axis direction; and a ram that is provided to the slider in a manner movable in the Z-axis direction and has an end attached with a probe.

In the coordinate measuring machine, a scale is provided along each of the X-, Y- and Z-axes to define a measurement coordinate system using values read from these scales as a reference. The coordinate measuring machine monitors temperature environment and reconstructs the measurement coordinate system upon detecting a temperature change.

According to the arrangement of Patent Literature 1, even when the scale(s) suffers from a dimensional change due to thermal expansion, a highly accurate measurement can be performed. However, the arrangement is not effective when components other than the scales, such as the column, support and ram, are thermally expanded. Since such thermal expansion lowers, in particular, measurement accuracy in the Z-axis direction, measurement environment needs to be accurately controlled. For instance, when the coordinate measuring machine is switched on and then a master ball showing the origin point position of the measurement system is continuously measured with the probe, an increase in the temperature of a drive motor for driving a contact point causes the thermal expansion of the column, support and ram with resulting different dimensional change amounts. Thus, mainly a Z-axis value is shifted as compared with a value when the measurement is started upon switch-on and thus a Z-axis measurement accuracy is lowered. In order to prevent such a lowered Z-axis measurement accuracy, an industrial machine capable of accurately calculating the Z-shift amount of the ram resulting from thermal expansion has been desired.

SUMMARY OF THE INVENTION

In view of the above problems, an object of the invention is to provide an industrial machine capable of a highly accurate calculation of a Z-axis shift amount of a ram resulting from thermal expansion.

According to an aspect of the invention, an industrial machine includes: a base surface; a column and a support that stand along a Z-axis perpendicular to the base surface; a beam that is provided between the column and the support; a slider that is movable on the beam; a ram that is held on the slider in a manner movable in a Z-axis direction; a temperature detecting unit that detects respective temperatures of the column, the support and the ram; and a shift amount calculating unit that calculates a Z-axis shift amount of the ram along the Z-axis direction resulting from a temperature change of each of the column, the support and the ram, in which the shift amount calculating unit calculates the Z-axis shift amount based on the respective temperatures of the column, the support and the ram detected by the temperature detecting unit, reference position data indicating a positional relationship between the column, the support and the ram when the column, the support and ram are at a predetermined reference temperature, and a compensation factor for calculating a dimensional change amount of each of the column, the support and the ram in the Z-axis direction resulting from the temperature change.

According to the above aspect of the invention, the temperature detecting unit detects the respective temperatures of the column, the support and the ram. Based on the respective temperatures of the column, the support and the ram detected by the temperature detecting unit, the reference position data indicating the positional relationship between the column, the support and the ram at a reference temperature (e.g., 20 degrees C.), and the compensation factor, the shift amount calculating unit calculates the shift amount of the ram when the column, the support and the ram are set at a predetermined temperature.

According to the above arrangement, even when the column, the support and the ram are heated to different temperatures and the resulting thermal expansion causes different dimensional changes thereof, it is possible to calculate the dimensional change amount of each of these components by using the compensation factor for the column, the support and the ram and the respective temperatures of the column, the support and the ram. Based on the dimensional change amount and the reference position data, the Z-axis shift amount can be accurately calculated.

In the industrial machine, it is preferable that the temperature detecting unit calculates an average temperature of the column, an average temperature of the support and an average temperature of the ram.

According to the above aspect of the invention, the temperature detecting unit calculates the average of the temperatures detected by temperature detecting sensors. For the calculation, for instance, the temperature detecting sensors may be provided to each of the column, the support and the ram at a distance therebetween along the Z-axis direction so that the average of the temperatures detected by the temperature detecting sensors is calculated or, alternatively, a single temperature detecting sensor may be provided to each of the column, the support and the ram at the center thereof in the Z-axis direction so that the temperature outputted from this temperature detecting sensor is obtained as an average temperature.

The temperature of each of the column, the support and the ram is likely to be different depending on a position in the Z-axis direction therein. For instance, when a drive motor for driving the column along the Y-axis direction is located at a lower portion of the column, the column has a different temperature at each position depending on a distance from the drive motor. In other words, the column has a larger dimensional change resulting from thermal expansion at an area closer to the drive motor and a smaller dimensional change resulting from thermal expansion at an area remoter from the drive motor. Since a heat transferred to the column is substantially proportional to a distance from the drive motor, by obtaining the average temperature of the entire column as in this aspect of the invention, it is possible to readily and accurately calculate the dimensional change amount of the column resulting from thermal expansion. The same applies to the support and the ram. Specifically, by calculating the average temperature of the support and the average temperature of the ram, the respective dimensional change amounts of them can be readily calculated, so that the shift amount calculating unit can precisely and readily calculate the Z-axis shift amount of the ram.

It is preferable that the industrial machine further includes: a Z-axis scale that is provided to the ram and is provided with graduations for measuring a movement amount of the ram in the Z-axis direction; and a Z-detector that is provided to the slider to read the graduations of the Z-axis scale, in which the reference position data includes: a distance $L_1$ from the base surface to the Z-detector at the reference temperature; a distance $L_2$ from an end of the ram opposed to the base surface to a fixed position of the Z-axis scale in the ram at the reference temperature; a distance $X_0$ from a center axis of the column to a center axis of the slider when the slider is set closest to the column; a distance $X_1$ from a center axis of the support to the center axis of the slider when the slider is set closest to the support; and a distance $X_2$ through which the slider is movable in an X-axis direction, the compensation factor includes: a thermal expansion coefficient $\alpha_c$ for the column; a thermal expansion coefficient $\alpha_s$ for the support; and a thermal expansion coefficient $\alpha_r$ for the ram, and the shift amount calculating unit calculates the Z-axis shift amount based on a temperature $T_c$ of the column detected by the temperature detecting unit, a temperature $T_s$ of the support detected by the temperature detecting unit, a temperature $T_r$ of the ram detected by the temperature detecting unit, and a position coordinate x of the slider by using an expression below, $$(Z\text{-axis shift amount}) = (X_0+x)^3 \times (\Delta S - \Delta C)/(X_0+X_1+X_2)^3 + \Delta C - \Delta Z \quad (1)$$

where: $\Delta C = (T_c - T_0) \times L_1 \times \alpha_c$,
$\Delta S = (T_s - T_0) \times L_1 \times \alpha_s$,
$\Delta Z = (T_r - T_0) \times L_2 \times \alpha_r$, and
$T_0$: the reference temperature.

In the industrial machine according to the aspect of the invention, the beam, which is held by the column and the support, is likely to be slanted by the thermal expansion of the column and the support. In particular, in an industrial machine, such as a coordinate measuring machine, provided with a column movable in the Y-axis direction, a slider movable in the X-axis direction and a ram movable in the Z-axis direction, an end of the support opposed to the base surface is generally a free end. In such an arrangement, the free end of the support opposed to the base surface moves toward the column while an end of the support on which the beam is held moves away from the column. As a result, the support is slanted relative to the Z-axis and thus the beam is also slanted relative to the base surface. At this time, the Z-axis shift amount of the slider on the beam changes within a Z-X plane substantially along a cubic curve shown in the above expression (1). In other words, by calculating the Z-axis shift amount based on the above expression (1), it is possible to calculate the Z-axis shift amount of the ram with a higher accuracy.

It is preferable that the industrial machine is a measurement machine that measures an object mounted on the base surface by using a contact point provided to the end of the ram, and the industrial machine further includes a compensator that compensates a Z-axis measurement value of the object measured by the contact point based on the Z-axis shift amount calculated by the shift amount calculating unit.

In the above industrial machine, for measuring the object mounted on the base surface, the contact point attached to the end of the ram opposed to the base surface is brought into contact with the object. At this time, even when the thermal expansion of the column, the support and the ram causes the shifting of the ram in the Z-axis direction, the Z-axis shift amount can be accurately calculated by the shift amount calculating unit as described above. Based on the calculated Z-axis shift amount, the compensator compensates a Z-measurement value of the object, so that the dimension of the object can be accurately measured.

According to the aspect of the invention, position compensation can be performed in consideration of the thermal expansion of the column, the support and the ram, so that the Z-axis shift amount of the ram of the industrial machine can be measured with a higher accuracy.

DETAILED DESCRIPTION OF PREFERRED EMBODIMENT(S)

An exemplary embodiment of the invention will be described below with reference to the attached drawings.

Schematic Arrangement of Coordinate Measuring Machine

Figure 1:
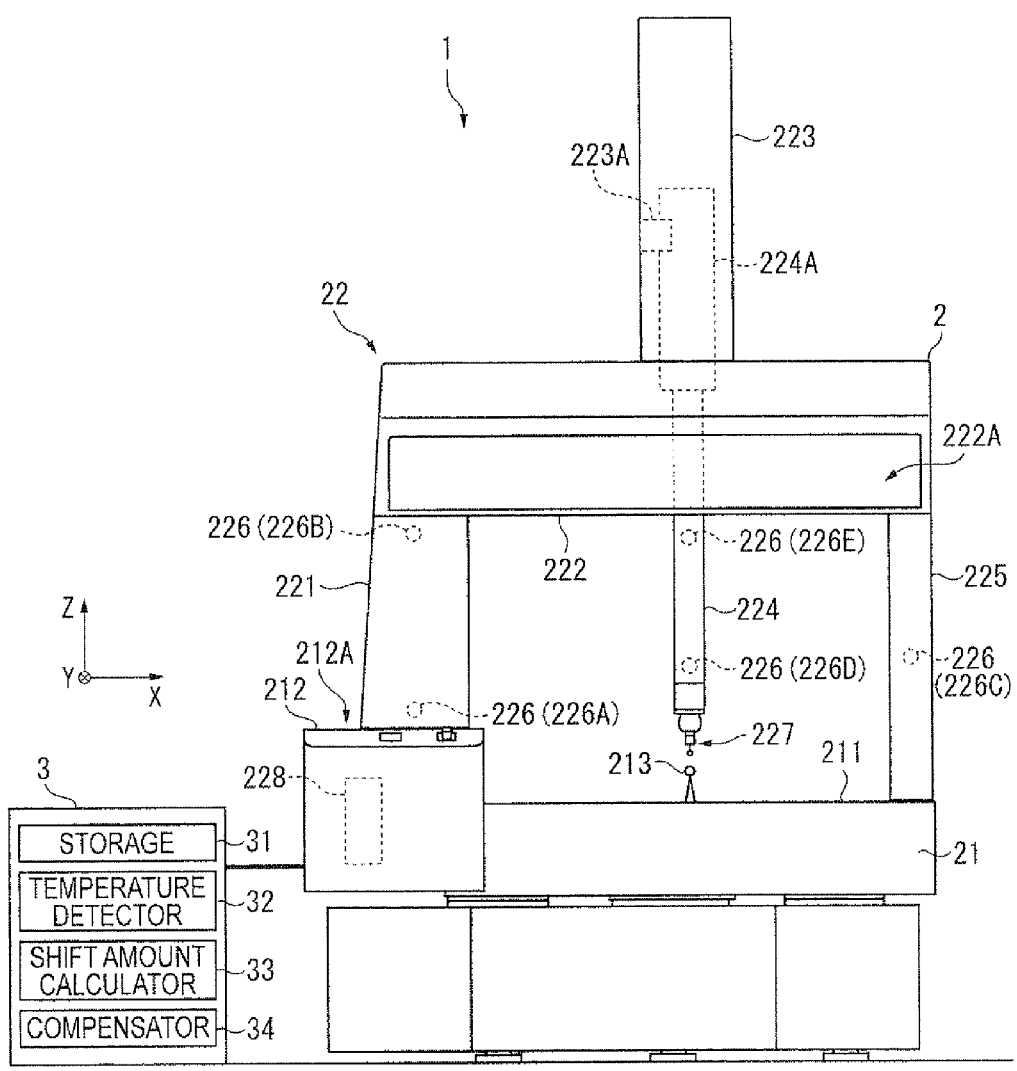
FIG. 1 is an illustration showing a schematic arrangement of a coordinate measuring machine (measuring instrument) as an example of an industrial machine according to an exemplary embodiment of the invention.

FIG. 1 is an illustration showing a schematic arrangement of a coordinate measuring machine as an example of an industrial machine according to an exemplary embodiment of the invention.

Referring to FIG. 1, a coordinate measuring machine 1 (measuring instrument) includes a body 2 and a controller 3 that controls the driving of the body 2.

The body 2 includes a base 21 and a slide mechanism 22 provided to the base 21.

The base 21 is formed in a shape of a rectangular plate having a base surface 211 on which an object (not shown) is to be mounted. Formed in the base 21 on the −X-axis direction side is a guide 212 that protrudes in the +Z-axis direction (see the coordinate system shown in FIG. 1: "Z-axis direction" will be abbreviated hereinafter as "Z-direction", "Z-axis (e.g., Z-axis side)" or "Z- (e.g., Z-side)" and the same applies to X- and Y-directions) and is linearly formed along the Y-axis direction to guide the slide mechanism 22 along the Y-axis direction. Further, a master ball 213 processed into a perfect sphere with a known radius is fixed on the base surface 211.

The slide mechanism 22 includes: a column 221 attached to the guide 212 and being movable along the Y-axis direction on the guide 212; a beam 222 supported on the column 221 and extending along the X-axis direction; a slider 223 formed in a cylindrical shape extending along the Z-axis direction and being movable on the beam 222 along the X-axis direction; and a ram 224 inserted in the slider 223 and being movable in the slider 223 along the Z-axis direction. An end of the beam 222 on the +X-axis direction side is provided with a support 225 extending along the Z-axis direction. An end of the ram 224 on the −Z-axis direction side is attached with a contact point 227 for measuring an object.

The slide mechanism 22 includes at least one drive motor 228 that drives the column 221, the slider 223 and the ram 224 so that the contact point 227 is movable along the X-, Y- and Z-axis directions under the control of the controller 3. Incidentally, FIG. 1 shows only the drive motor 228 for moving the column 221 along the Y-axis direction.

The body 2 is provided with a measurement device for detecting the respective axial positions of the column 221, the slider 223 and the ram 224, Specifically, the guide 212 is provided with a Y-axis scale 212A along the Y-axis direction and the column 221 is provided with a Y-axis scale sensor (not shown) that reads out a value of the Y-axis scale 212A. The beam 222 is provided with an X-axis scale 222A along the X-axis direction and the slider 223 is provided with an X-axis scale sensor (not shown) that reads out a value of the X-axis scale 222A. The ram 224 is attached with a Z-axis scale 224A along the Z-axis direction and a Z-axis scale sensor 223A that reads out a value of the Z-axis scale 224A is provided in the slider 223 that supports the ram 224 in a manner movable along the Z-axis direction.

Further, temperature detecting sensors 226 (226A, 226B, 226C, 226D and 226E) are provided to the column 221, the ram 224 and the support 225 for detecting the respective temperatures thereof. These temperature detecting sensors 226 are a part of a temperature detecting unit according to the invention.

The temperature detecting sensor 226A is provided to an end of the column 221 on the −Z side while the temperature detecting sensor 226B is provided to an end of the column 221 on the +Z-axis side. These temperature detecting sensors 226A and 226B are thus distanced from each other along the Z-direction. Preferably, these temperature detecting sensors 226A and 226B are substantially equally distanced from the center of the column 221 in the Z-axis direction.

The temperature detecting sensor 226C is provided to the center of the support 225 in the Z-direction.

The temperature detecting sensor 226D is provided to the end of the ram 224 on the −Z side while the temperature detecting sensor 226E is provided to an end of the ram 224 on the +Z side. These temperature detecting sensors 226A and 226B are thus distanced from each other along the Z-axis direction. Preferably, these temperature detecting sensors 226D and 226E are substantially equally distanced from the center of the ram 224 in the Z-axis direction.

In addition to a CPU (Central Processing Unit), a memory and the like, the controller 3 includes: a storage 31; a temperature detector 32 that obtains temperatures detected by the temperature detecting sensors 226; a shift amount calculator 33 (shift amount calculating unit) that calculates a Z-shift amount of the ram 224 based on a coordinate position of the contact point detected by the scale sensors and the temperatures detected by the temperature detecting sensors 226; and a compensator 34 that compensates a Z-axis measurement value based on the calculated Z-shift amount. Incidentally, according to this exemplary embodiment, the temperature detector 32 and the temperature detecting sensors 226 serve as the temperature detecting unit according to the invention.

The storage 31 is adapted to store information used by the controller 3, such as reference position data regarding a reference position that is measured in advance at a reference temperature (e.g., 20 degrees C.) when the coordinate measuring machine 1 is manufactured, a parameter such as a thermal expansion coefficient (compensation factor) for each of the column 221, the ram 224 and the support 225, and the like.

Figure 2:
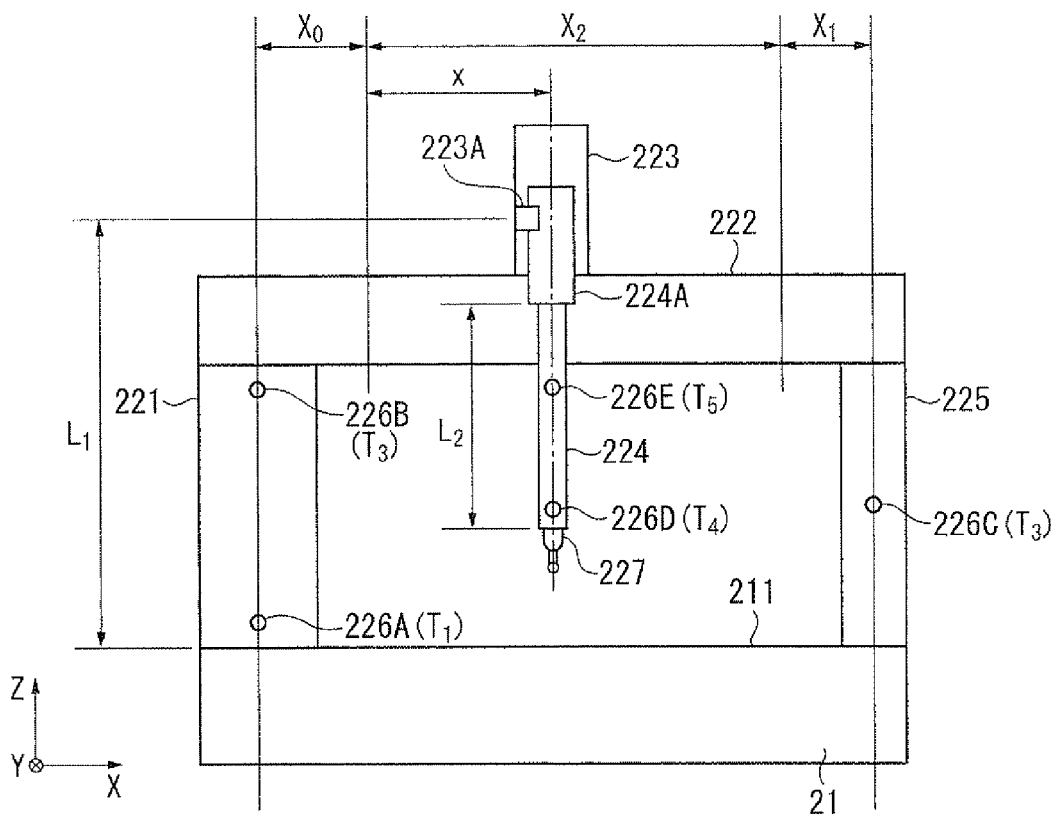
FIG. 2 is an illustration for explaining a method of calculating a Z-axis shift amount by a shift amount calculator.
Figure 2:
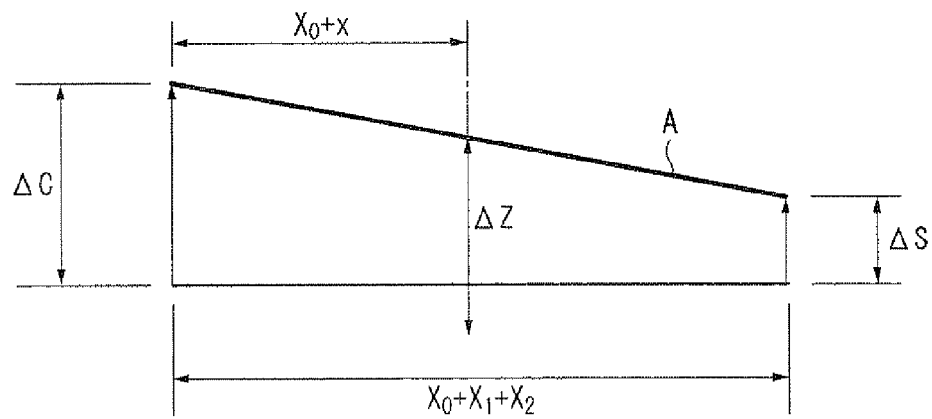

In this exemplary embodiment, stored as the reference position data are: a distance $L_1$ from the base surface 211 to the Z-axis scale sensor 223A obtained at the reference temperature; a distance $L_2$ in the ram 224 from the end to which the contact point 227 is fixed to the fixed position of the Z-axis scale 224A obtained at the reference temperature; a distance $X_0$ between the center axis of the column 221 and the center axis of the slider 223 when the slider 223 is moved furthest toward the column 221 (x=0); a distance $X_1$ between the center axis of the slider 223 and the center axis of the support 225 when the slider 223 is moved furthest toward the support 225 (x=xmax); and a movable distance $X_2(=x_{max})$ of the slider 223 (See FIG. 2).

The storage 31 also stores a Z-shift compensation program for the controller 3 to compensate a shift of the ram 224 in the Z-axis direction resulting from thermal expansion.

The temperature detector 32 detects the temperatures of the temperature detecting sensors 226 and calculates the respective average temperatures of the column 221, the ram 224 and the support 225 from these detected temperatures. Specifically, when the temperature of the temperature detecting sensor 226A is represented by $T_1$, the temperature of the temperature detecting sensor 226B is represented by $T_2$, the temperature of the temperature detecting sensor 226C is represented by $T_3$, the temperature of the temperature detecting sensor 226D is represented by $T_4$, and the temperature of the temperature detecting sensor 226E is represented by $T_5$, the temperature detector 32 calculates an average temperature $T_c$ of the column 221, an average temperature $T_r$ of the ram 224, and an average temperature $T_s$ of the support 225 by using the following expressions.

$$T_c = (T_1 + T_2)/2 \tag{2}$$

$$T_r = (T_4 + T_5)/2 \tag{3}$$

$$T_s = T_3 \tag{4}$$

The shift amount calculator 33 calculates the Z-shift amount of the ram 224 (contact point 227) resulting from the thermal expansion of the column 221, the ram 224 and the support 225 caused by a change in measurement environment.

FIG. 2 is an illustration for explaining a method of calculating the Z-shift amount by the shift amount calculator 33.

As shown in FIG. 2, when the distance from the base surface 211 to the Z-axis scale sensor 223A at the reference temperature is $L_1$ and the distance in the ram 224 from the end to which the contact point 227 is fixed to the fixed position of the Z-axis scale 224A is $L_2$, the column 221, the ram 224 and the support 225 are thermally expanded with resulting dimensional changes by $\Delta C$, $\Delta Z$ and $\Delta S$, respectively. When the reference temperature $T_0$ is 20 degrees C. and respective thermal expansion coefficients for the column 221, the ram 224 and the support 225 are $\alpha_c$, $\alpha_r$ and $a_s$, these parameters $\Delta C$, $\Delta Z$ and $\Delta S$ can be calculated based on the above expression (1) as follows.

$$\Delta C = (T_c - 20) \times L_1 \times \alpha_c \tag{5}$$

$$\Delta S = (T_s - 20) \times L_1 \times \alpha_s \tag{6}$$

$$\Delta Z = (T_r - 20) \times L_2 \times \alpha_r \quad (7)$$

When the slide mechanism 22 suffers from a dimensional change resulting from thermal expansion, since the drive motor 228 for driving the column 221 is located on the −Z-side of the column 221, the column 221 is more affected by heat than the support 225 and thus a change value of the column 221 is larger. Since the end of the support 225 near the base surface 211 is a free end, when each of the column 221 and the support 225 is thermally expanded to be deformed as described above, the weight of the beam 222 or the like makes the free end (an end on the −Z-side) of the support 225 move toward the −X-side, so that the beam 222 is slanted to be shifted in the −Z-side toward the +X-direction. In this state, when the slider 223 is moved on the beam 222 along the X-axis direction, the Z-shift amount of the ram 224 (contact point 227) changes as represented by the above expression (1) in accordance with the position of the slider 223, i.e., a cubic expression of the x-coordinate.

Accordingly, the shift amount calculator 33 calculates the Z-shift amount of the ram 224 (contact point 227) based on the above expression (1) to obtain an accurate value.

Based on the Z-shift amount calculated by the shift amount calculator 33, the compensator 34 compensates a Z-measurement value measured by the Z-axis scale sensor 223A.

Figure 3:
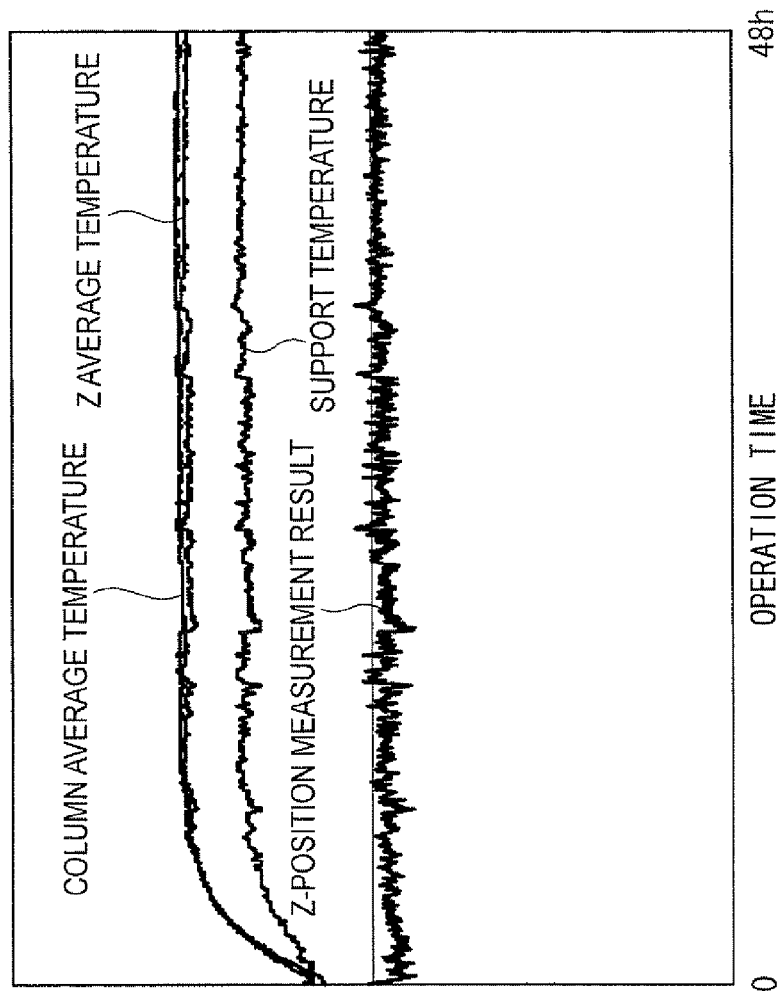
FIG. 3 is a graph showing a Z-position measurement result of a master ball (x=40) when a compensator performs compensation based on the Z-axis shift amount calculated by the shift amount calculator as well as a temperature detection result of each of the column, the ram and the support.
Figure 4:
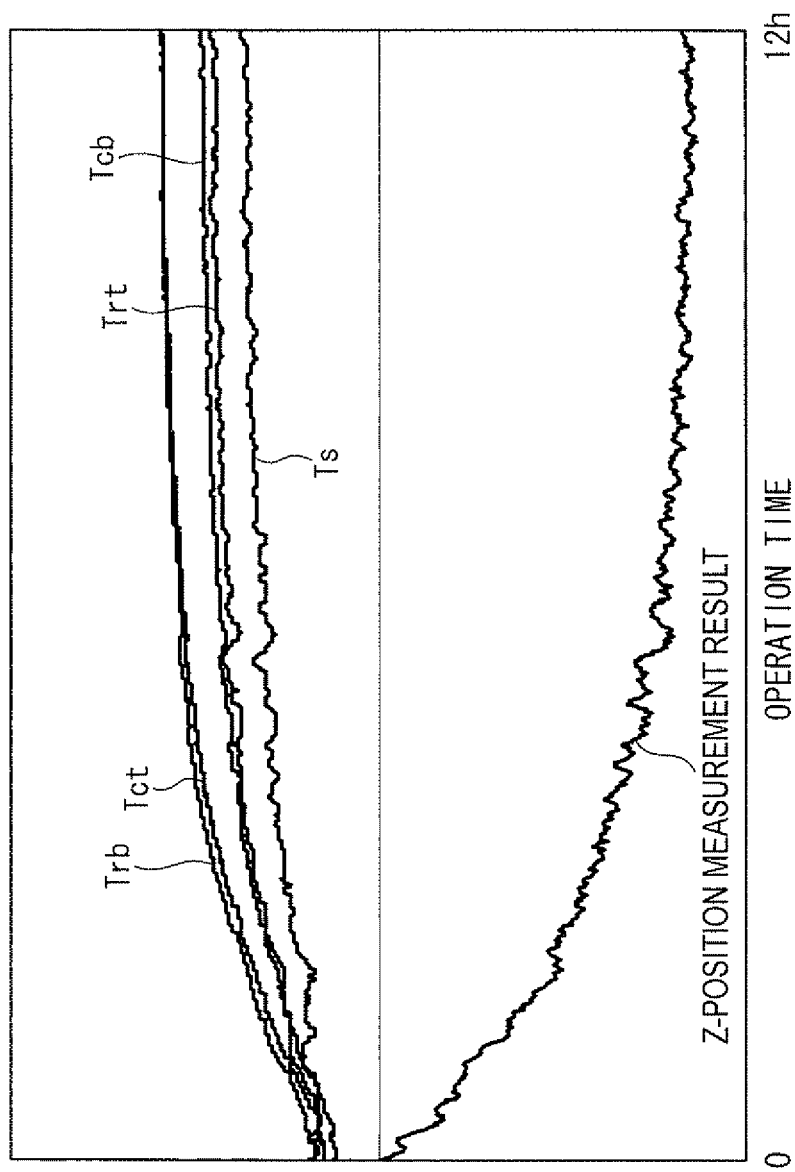
FIG. 4 is a graph showing a Z-position measurement result of the master ball (x=40) without calculation of a Z-axis shift amount by the shift amount calculator and compensation by the compensator as well as a temperature detection result of each of the temperature detecting sensors.

FIG. 3 is a graph showing a Z-position measurement result of the master ball 213 (x=40) when the compensator 34 performs compensation based on the Z-shift amount calculated by the shift amount calculator 33 as well as an average temperature detection result of each of the column 221, the ram 224 and the support 225. FIG. 4 is a graph showing a Z-position measurement result of the master ball 213 (x=40) without calculation of the Z-shift amount by the shift amount calculator 33 and compensation by the compensator 34 as well as a temperature detection result of each of the temperature detecting sensors 226. In FIG. 4, Tcb is a temperature measurement result from the temperature detecting sensor 226A, Tct is a temperature measurement result from the temperature detecting sensor 226B, Ts is a temperature measurement result from the temperature detecting sensor 226C, Trb is a temperature measurement result from the temperature detecting sensor 226D, and Trt is a temperature measurement result from the temperature detecting sensor 226E. In FIGS. 3 and 4, a horizontal axis represents an operation time of the coordinate measuring machine 1 elapsed after it is switched on and vertical axes are the same scales, respectively.

As shown in FIG. 4, without compensation based on the Z-shift amount, the Z-position of the master ball 213 is shifted within an initial period of the operation time. In contrast, as shown in FIG. 3, with compensation based on the Z-shift amount calculated by the shift amount calculator 33, the Z-position of the master ball 213 is hardly shifted after the operation is started. In view of this, the effect of the compensation can be confirmed.

Method of Compensating Z-measurement Value

Next, a method of compensating a Z-measurement value will be described.

Figure 5:
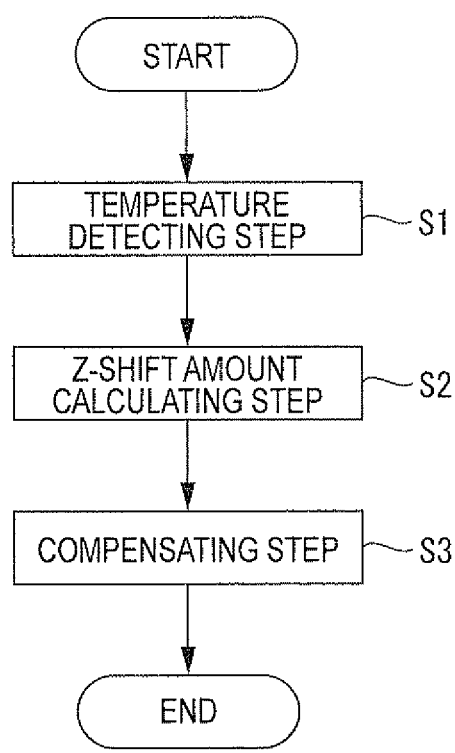
FIG. 5 is a flow chart showing a method of compensating a Z-measurement value.

FIG. 5 is a flow chart showing a method of compensating a Z-measurement value.

Upon execution of the Z-shift compensation program stored in the storage 31, the controller 3 performs the following steps S1 to S3 as shown in FIG. 5.

When the Z-shift compensation program is executed, the temperature detector 32 detects the temperatures of the temperature detecting sensors 226 and calculates the respective average temperatures of the column 221, the ram 224 and the support 225 based on the above expressions (2) to (4) (S1: temperature detecting step).

Next, the shift amount calculator 33 obtains the reference position data ($L_1, L_2, X_0, X_1$ and $X_2$) from the storage 31 and calculates a Z-shift amount from the respective average temperatures calculated in the temperature detecting step (step S1) and an x-coordinate that represents the position of the slider 223 by using the above expressions (5) to (7) (S2: Z-shift amount calculating step).

When the Z-shift amount is calculated in the Z-shift amount calculating step (step S2), the compensator 34 compensates a Z-measurement value measured by the Z-axis scale 224A and the Z-axis scale sensor 223A with the Z-shift amount (S3: compensating step).

By performing the above steps S1 to S3, the Z-shift amount is added to or subtracted from the Z-measurement value to obtain an accurate Z-measurement value.

ADVANTAGES OF EXEMPLARY EMBODIMENT

As described above, in the coordinate measuring machine 1 according to this exemplary embodiment, each of the column 221, the ram 224 and the support 225 is provided with the temperature detecting sensor(s) 226, so that the temperature detector 32 can detect the respective average temperatures of the column 221, the ram 224 and the support 225 from these temperature detecting sensors 226. The shift amount calculator 33 calculates the Z-shift amount of the ram 224 (contact point 227) along the Z-axis based on the detected respective average temperatures ($T_c, T_r$ and $T_s$), the reference position data ($L_1, L_2, X_0, X_1$ and $X_2$) and the thermal expansion coefficients ($\alpha_c, \alpha_r$ and $\alpha_s$) as a compensation factor.

According to the above arrangement, even when the column 221, the ram 224 and the support 225 are heated to different temperatures by, for instance, the heat of the drive motor 228 and the resulting thermal expansion causes dimensional changes thereof, the dimensional change amount of each of the column 221, the ram 224 and the support 225 can be calculated based on the respective thermal expansion coefficients therefor and the Z-shift amount can be readily calculated based on these dimensional change amounts. Additionally, based on the detected Z-shift amount, the compensator 34 compensates the Z-measurement value. Thus, the measurement can be performed with a high accuracy by appropriately compensating the measurement value.

As described above, the column 221 is provided with the two temperature detecting sensors 226A and 226B and the ram 224 is provided with the two temperature detecting sensors 226D and 226E so that the temperature detector 32 calculates the average temperature of the column 221 and the average temperature of the ram 224 from the temperatures detected by these temperature detecting sensors 226A, 226B, 226D and 226E.

According to the above arrangement, a temperature difference is likely to be generated in each of the column 221 and the ram 224 depending on a distance from a heat source, i.e., the drive motor 228. Since a heat quantity transferred from the heat source is substantially proportional to the distance, the dimensional change amounts of the column 221 and the ram 224 resulting from thermal expansion can be calculated based on the average temperatures of the column 221 and the ram 224, respectively.

The support 225, to which no driving force is transferred from a driving source, is located at a position remoter from the drive motor 228 than the column 221 and the ram 224, so that there is no substantial temperature difference in the support 225 between the end on the −Z-side and the end on the +Z-axis side. Accordingly, in this exemplary embodiment, the single temperature detecting sensor 226C is provided to the support 225 at the center thereof in the Z-axis direction in this exemplary embodiment. In contrast, when another heat source such as a driving source is located in the vicinity of the support 225, a temperature difference is likely to be generated between positions in the support 225 under the influence of this heat source. In such a case, not only the column 221 and the ram 224 but also the support 225 may also be provided with a plurality of temperature detecting sensors 226 so that the temperature detector 32 calculates the average temperature of the support 225 based on these temperature detecting sensors 226 provided to the support 225.

Based on the average temperatures ($T_c$, $T_r$ and $T_s$) detected by the temperature detector 32, the reference position data ($L_1$, $L_2$, $X_0$, $X_1$ and $X_2$) and the x-coordinate of the slider 223, the shift amount calculator 33 calculates the Z-shift amount of the ram 224 (contact point 227) by using the above expression (1). The expression (1) is a relational expression representing that while the support 225, the end on the −Z-side of which is a free end, is slanted relative to the base surface 211, the Z-shift amount of the ram 224 relative to the x-coordinate position of the slider 223 is changed in accordance with a cubic expression. By calculating the Z-shift amount based on the expression (1), the Z-shift amount can be calculated with a higher accuracy as shown in, for instance, FIG. 3.

Modifications

It should be appreciated that the scope of the invention is not limited to the above exemplary embodiment but modifications and improvements that are compatible with an object of the invention are included within the scope of the invention.

For instance, although an industrial machine is exemplified by the coordinate measuring machine 1 in the above exemplary embodiment, the invention is not limited thereto, In other words, the invention is applicable to any industrial machine as long as the machine includes: a column and a support that stand on a base surface; a beam that is provided between the column and the support; and a slider that is movable on the beam. For instance, the invention may be applied to an industrial machine such as a robot manipulator with a ram having an end to which a processing tool or the like for processing a workpiece is attached. In such an industrial machine, a Z-shift amount resulting from a temperature change is calculated and the position of the ram is adjusted in accordance with the calculated Z-shift amount, so that the workpiece can be processed at an appropriate position thereon.

Although the shift amount calculator 33 calculates a Z-shift amount based on the expression (1) according to the above exemplary embodiment, the shift amount calculator 33 may calculate a Z-shift amount based on, for instance, a primary expression of x or a quadric expression of x such as the following expression (8) or (9).

$$(Z\text{-shift amount})=(X_0+x)^2\times(\Delta S-\Delta C)/(X_0+X_1+X_2)^2+\Delta C-\Delta Z \quad (8)$$

$$(Z\text{-shift amount})=(X_0+x)\times(\Delta S-\Delta C)/(X_0+X_1+X_2)+\Delta C-\Delta Z \quad (9)$$

Although two of the temperature detecting sensors 226 are provided to each of the column 221 and the ram 224 and the temperature detector 32 calculates the average temperature of the column 221 and the average temperature of the ram 224 based on these temperature detecting sensors 226, for instance, one of the temperature detecting sensors 226 may be provided to each of the column 221 and the ram 224 at the center thereof in the Z-axis direction. Although two of the temperature detecting sensors 226 are provided to each of the column 221 and the ram 224, for instance, three or more of the temperature detecting sensors 226 may be provided. As described above, the support 225 may also be provided with a plurality of temperature detecting sensors 226.

Additionally, any specific structure or process according to the above exemplary embodiment may be appropriately altered to a different structure or the like that is compatible with an object of the invention within the scope of the invention.

The invention claimed is:

1. An industrial machine comprising:
a base surface;
a column and a support that stand along a Z-axis perpendicular to the base surface;
a beam that is provided between the column and the support;
a slider that is movable on the beam;
a ram that is held on the slider in a manner movable in a Z-axis direction;
a temperature detecting unit that detects a temperature $T_c$ of the column, a temperature $T_s$ of the support and a temperature $T_r$ of the ram;
a Z-axis scale that is provided to the ram and is provided with graduations for measuring a movement amount of the ram in the Z-axis direction;
a Z-detector that is provided to the slider to read the graduations of the Z-axis scale, and
a shift amount calculating unit that calculates a Z-axis shift amount of the ram along the Z-axis direction resulting from a temperature change of each of the column, the support and the ram, wherein
the shift amount calculating unit calculates the Z-axis shift amount based on the temperature $T_c$ of the column, the temperature $T_s$ of the support and a temperature $T_r$ of the ram detected by the temperature detecting unit, reference position data indicating a positional relationship between the column, the support and the ram when the column, the support and ram are at a predetermined reference temperature, a compensation factor for calculating a dimensional change amount $\Delta_C$ of the column, a dimensional change amount $\Delta_S$ of the support, a dimensional change amount $\Delta_Z$ of the ram in the Z-axis direction resulting from the temperature change, and position coordinate x of the slider,
the reference position data comprises:
a distance $L_1$ from the base surface to the Z-detector at the reference temperature;
a distance $L_2$ from an end of the ram opposed to the base surface to a fixed position of the Z-axis scale in the ram at the reference temperature;
a distance $X_0$ from a center axis of the column to a center axis of the slider when the slider is set closest to the column;
a distance $X_1$ from a center axis of the support to the center axis of the slider when the slider is set closest to the support; and
a distance $X_2$ through which the slider is movable in an X-axis direction,
the compensation factor comprises:
a thermal expansion coefficient $\alpha_c$ for the column;
a thermal expansion coefficient $\alpha_s$ for the support; and
a thermal expansion coefficient $\alpha_r$ for the ram, and the shift amount calculating unit calculates the Z-axis shift amount by using an expression below, $$(\text{Z-axis shift amount}) = (X_o + x)^3 \times (\Delta S - \Delta C)/(X_0 + X_1 + X_2)^3 + \Delta C - \Delta Z$$

where: $\Delta C = (T_c - T_0) \times L_1 \times \alpha_c$
$\Delta S = (T_s - T_0) \times L_1 \times \alpha_s$
$\Delta Z = (T_r - T_0) \times L_2 \times \alpha_r$, and
$T_0$: the reference temperature.

2. The industrial machine according to claim 1, wherein the temperature detecting unit calculates an average temperature of the column, an average temperature of the support and an average temperature of the ram.

3. The industrial machine according to claim 1, wherein the industrial machine is a measurement machine that measures an object mounted on the base surface by using a contact point provided to the end of the ram, and
the industrial machine further comprises a compensator that compensates a Z-axis measurement value of the object measured by the contact point based on the Z-axis shift amount calculated by the shift amount calculating unit.

* * * * *